United States Patent
Chemmengath et al.

(10) Patent No.: US 10,891,437 B2
(45) Date of Patent: Jan. 12, 2021

(54) SCRIPT MODIFICATION

(71) Applicant: International Business Machines Corporation, Armonk, NY (US)

(72) Inventors: Saneem Chemmengath, Kerala (IN); Parag Jain, Bangalore (IN); Anirban Laha, Chinsurah (IN); Saravanan Krishnan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 16/165,039

(22) Filed: Oct. 19, 2018

(65) Prior Publication Data
US 2020/0125638 A1 Apr. 23, 2020

(51) Int. Cl.
*G06F 40/30* (2020.01)
*G06F 40/205* (2020.01)
*G06F 3/0481* (2013.01)
*G06F 3/0484* (2013.01)
*G06N 20/00* (2019.01)

(52) U.S. Cl.
CPC ............ *G06F 40/30* (2020.01); *G06F 40/205* (2020.01); *G06F 3/0481* (2013.01); *G06F 3/04847* (2013.01); *G06N 20/00* (2019.01)

(58) Field of Classification Search
USPC .............................................. 704/7–10, 257
See application file for complete search history.

(56) References Cited

U.S. PATENT DOCUMENTS

| 7,890,534 B2 | 2/2011 | Bathiche et al. |
| 8,428,934 B2 | 4/2013 | Connor |
| 8,627,203 B2 | 1/2014 | Chang et al. |
| 2011/0184727 A1 | 7/2011 | Connor |
| 2011/0239119 A1* | 9/2011 | Phillips ............... G06F 16/7834 715/731 |

(Continued)

FOREIGN PATENT DOCUMENTS

EP 3121734 A 1/2017

OTHER PUBLICATIONS

G.I. Lin et al., "All the World's a Stage: Learning Character Models from Film," Proceedings of the Seventh AAAI Conference on Artificial Intelligence and Interactive Digital Entertainment (AIIDE), Oct. 10-14, 2011, pp. 46-52.

(Continued)

*Primary Examiner* — Leonard Saint Cyr
(74) *Attorney, Agent, or Firm* — Ryan, Mason & Lewis, LLP

(57) ABSTRACT

Techniques for script modification are provided including receiving a script and parsing the script to identify at least one attribute of the script. The identified at least one attribute is presented to a user in a graphical user interface via a display device and an adjustment of at least one element in the graphical user interface that corresponds to the at least one attribute is received from the user via an input device. Modification data corresponding to the at least one attribute are received from a data repository and at least one attribute of the script is modified based on the received adjustment and the obtained modification data corresponding to the at least one attribute. A modified script is generated based on the modified at least one attribute.

20 Claims, 7 Drawing Sheets

(56) References Cited

U.S. PATENT DOCUMENTS

| | | | | |
|---|---|---|---|---|
| 2013/0024838 A1* | 1/2013 | Yang | ................. | G06F 8/30 |
| | | | | 717/113 |
| 2013/0151970 A1* | 6/2013 | Achour | ............... | G06Q 10/101 |
| | | | | 715/723 |
| 2015/0324345 A1* | 11/2015 | Dubbin | ................ | G06Q 10/101 |
| | | | | 715/220 |
| 2016/0139786 A1 | 5/2016 | Kaldma et al. | | |
| 2018/0300958 A1* | 10/2018 | Schriber | ............... | G06F 40/166 |
| 2019/0107927 A1* | 4/2019 | Schriber | ................. | G06N 5/04 |
| 2019/0108206 A1* | 4/2019 | Dubbin | ................. | G06F 40/117 |
| 2019/0155829 A1* | 5/2019 | Schriber | ............... | G06F 3/0484 |

OTHER PUBLICATIONS

A. Agarwal et al., "Parsing Screenplays for Extracting Social Networks from Movies," Proceedings of the 3rd Workshop on Computational Linguistics for Literature (CLFL), Apr. 2014, pp. 50-58.

\* cited by examiner

SCRIPT MODIFICATION

FIELD

The present application generally relates to natural language processing, and, more particularly, to the analysis and modification of scripts.

BACKGROUND

Writers often put a large amount of effort into developing a script for a movie, screen play, television show, radio broadcast, audiobook, novel, or other similar piece of literature or media. For example, a writer may spend a significant amount of time and resources developing characters, contexts, backdrops, scenes, timelines, or other similar features for their script.

SUMMARY

In one embodiment of the present invention, techniques for script modification using character, context, backdrop, or other information are provided. An exemplary computer-implemented method can include steps of receiving a script and parsing the script to identify at least one attribute of the script. The identified at least one attribute is presented to a user in a graphical user interface via a display device and an adjustment of at least one element in the graphical user interface that corresponds to the at least one attribute is received from the user via an input device. Modification data corresponding to the at least one attribute are received from a data repository and at least one attribute of the script is modified based on the received adjustment and the obtained modification data corresponding to the at least one attribute. A modified script is generated based on the modified at least one attribute.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Writers often put a large amount of effort into developing a script for a movie, screen play, television show, radio broadcast, audiobook, novel, or other similar piece of literature or media. For example, a writer may develop characters, contexts, backdrops, scenes, timelines, or other similar features for their script. Often the content of a particular script may be targeted at a particular audience or market. For example, the content of a script for a movie may be targeted at a U.S. audience. However, the content may not be appropriate for other parts of the world. For example, the script may include mention of particular locations, slang, collective knowledge, or other similar attributes that, while known to a particular target audience may not be known to other audiences having different attributes. For example, a script for a movie targeted at a U.S. audience that mentions U.S. locations and uses slang known to audiences in the U.S. may not be appropriate for an audience in India. For example, the audience in India may not be familiar with the U.S. locations, slang, or other attributes of the script that were tailored for the U.S. audience. Modifying a script for use with a different target audience typically involves significant amounts of time and effort on the part of writers. For example, the writers need to research the target audience, modify the script in view of the unique cultural, regional, location, or demographic knowledge of the target audience, modify the language and utterances used in the script to match the target audience, or undertake other similar labor-intensive practices. In addition, if a script writer wishes to change an era of the script, for example, from the 2000s to the 1800s, significant effort must be expended to research the target era and modify the script in view of unique time related attributes of that era including, for example, phraseology used by individuals of that time, collective knowledge of individuals at that time, or other similar attributes.

The techniques disclosed herein include rules and features that may be used by a script writer to modify a script quickly and efficiently without requiring significant effort on the part of the writer to both research the target modification and manually modify the script line by line.

Figure 1:
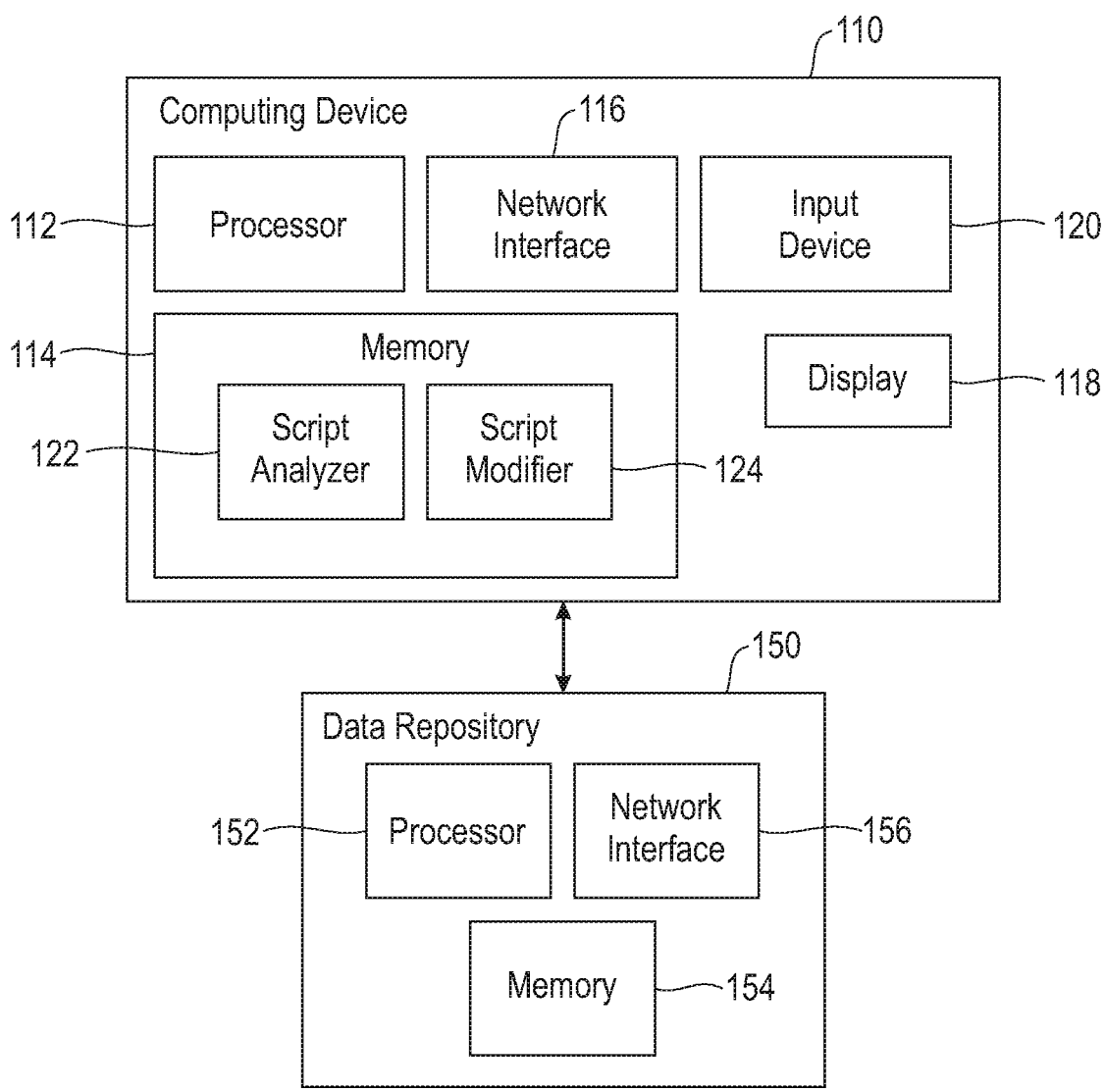
FIG. 1 is a diagram illustrating system architecture, according to an exemplary embodiment of the invention.

With reference now to FIG. 1, an embodiment of a system architecture 100 for script modification is illustrated. In some embodiments, system 100 includes a computing device 110, and a data repository 150.

Computing device 110 includes at least one processor 112, memory 114, at least one network interface 116, a display 118, an input device 120, and may include any other features commonly found in a computing device. In some embodiments, computing device 110 may include, for example, a personal computer, workstation, laptop, tablet, smart device, smart phone, smart watch, or any other similar computing device that may be used by a user.

Processor 112 may include, for example, a central processing unit (CPU), a microcontroller, Field Programmable Gate Array (FPGAs), or any other form of processing circuitry that is configured to perform various operations. Processor 112 may be configured to execute instructions as described below. These instructions may be stored, for example, in memory 114. As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor," may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Memory 114 may include, for example, computer readable media or computer readable storage media in the form of volatile memory, such as random-access memory (RAM) and/or cache memory or others. Memory 114 may include, for example, other removable/non-removable, volatile/non-volatile storage media. By way of non-limiting examples only, memory 114 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

In some embodiments, computer software including instructions or code for performing the methodologies of the invention, as described herein, may be stored in associated memory 114 and, when ready to be utilized, loaded in part or in whole (for example, into RAM) and implemented by processor 112. Such software could include, but is not limited to, firmware, resident software, microcode, and the like. The memory 114 may include local memory employed during actual implementation of the program code, bulk storage, and cache memories which provide temporary storage of at least some program code in order to reduce the number of times code must be retrieved from bulk storage during implementation.

In some embodiments, computing device 110 may include a script analyzer 122, e.g., computer software instructions or code, stored in memory 114 that is configured to analyze and parse a script for attributes of the script as will be described in more detail below. In some embodiments, script analyzer 122 may alternatively be stored remote from computing device 110, e.g., on a server or other system. For example, computing device 110 may access or execute script analyzer 122 to analyze and parse a script. In some embodiments, script analyzer 122 may be an application programming interface (API) that is activatable or executable by computing device 110 to offload the analysis and parsing processing to a remote processing center, e.g., a server or other similar system.

In some embodiments, computing device 110 may include a script modifier 124, e.g., computer software instructions or code, stored in memory 114 that is configured to modify attributes of a script as will be described in more detail below. In some embodiments, script modifier 124 may alternatively be stored remote from computing device 110, e.g., on a server or other system. For example, computing device 110 may access or execute script modifier 124 to modify a script. In some embodiments, script modifier 124 may be an application programming interface (API) that is activatable or executable by computing device 110 to offload the modification processing to a remote processing center, e.g., a server or other similar system.

Network interface 116 is configured to transmit and receive data or information to and from a data repository 150 or any other server, component, or computing device via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from data repository 150 including components of data repository 150.

Display 118 may include any display device that is configured to display information to a user of computing device 110. For example, in some embodiments, display 118 may include a computer monitor, television, smart television, or other similar displays. In some embodiments, display 118 may be integrated into or associated with computing device 110, for example, as a display of a laptop, smart phone, smart watch, or other smart wearable devices, as a virtual reality headset associated with computing device 110, or any other mechanism for displaying information to a user. In some embodiments, display 118 may include, for example, a liquid crystal display (LCD), an e-paper/e-ink display, an organic LED (OLED) display, or other similar display technologies. In some embodiments, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a user with the capability to interact with computing device 110.

Data repository 150 includes a processor 152, memory 154, and a network interface 156 that may include similar functionality as processor 112, memory 114, and network interface 116. In some embodiments, data repository 150 may, for example, be any computing device, server, database or similar system, or any combination thereof, that is configured to interact with or provide data to computing device 110. In some embodiments, for example, data repository 150 may include a distributed storage system including a plurality of servers, databases, or other components. In some embodiments, the data stored in data repository 150 may alternatively be stored in memory 114 of computing device 110 for use by computing device 110 such that no connection to a data repository 150 may be necessary to obtain the data.

Figure 2:
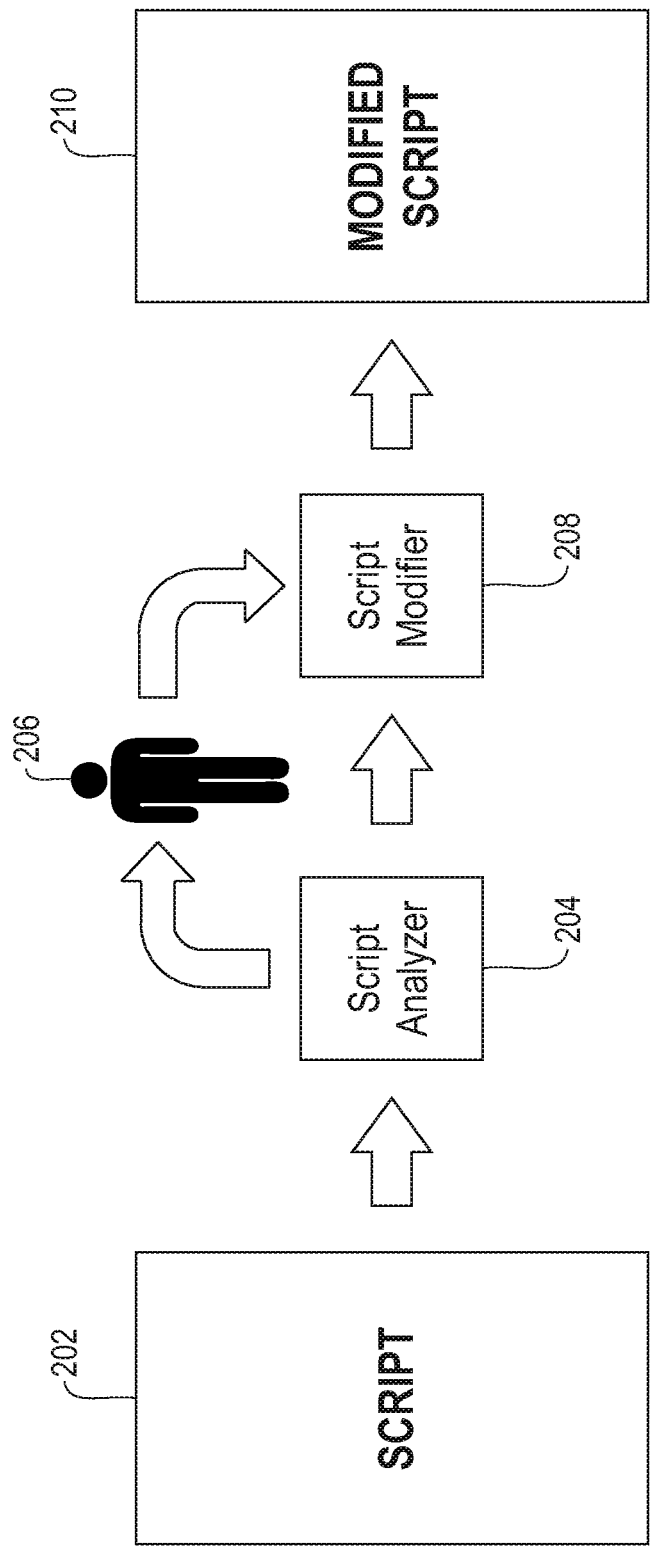
FIG. 2 is a flow diagram illustrating techniques according to an embodiment of the invention.

FIG. 2 is a flow diagram illustrating a method according to an illustrative embodiment.

At 202, a script may be obtained by computing device 110. For example, the script may be obtained from a user input, e.g., via input device 120. In some embodiments, the script may be obtained from data repository 150. In some embodiments, the script may be stored in memory 114 and may be obtained from memory 114.

At 204, computing device 110 may execute script analyzer 122 to analyze and parse the script to identify attributes of the script. For example, the script may be analyzed or parsed using key words, natural language processing, machine learning, or using other similar functionality to identify attributes of the script.

In some embodiments, for example, some or all of the script may have a structured format and script analyzer 122 may employ a set of rules based on the structured format to identify each attribute of the script. In some embodiments, the script may have an unstructured format and script analyzer 122 may employ natural language processing, machine learning, or a combination thereof, to identify each attribute in the script. In some embodiments, the script may include both structured and unstructured formats where script analyzer 122 may employ a combination of rules, natural language processing, machine learning, or other similar functionality to identify attributes of the script.

In some embodiments, script analyzer 122 may obtain data from data repository 150 that may assist the script analyzer 122 in analyzing the script. For example, rules for parsing the script, rules for natural language processing of the script, machine learning models for analyzing scripts, or other similar functionality may be obtained from data repository 150. In some embodiments, for example, data repository 150 may also store rules for identifying a language of the script.

A non-limiting list of attributes of a script may include, for example, characters, utterances made by the characters, targets of the utterances made by the characters, scenes of the script, locations in the script or each scene or portion of the script, an era of the script or each scene or portion of the script, e.g., 1800s, 1900s, etc., a context of the script or each scene or portion of the script, a language of the script or each scene or portion of the script, a region specific touch of the script or each scene or portion of the script, characteristics of a character including, for example, demographic, age, vocabulary, sophistication, cursing, gender, region, background, job, social class, or any other characteristic of the character, a backdrop for the script or each scene or portion of the script, or any other attribute of a script.

In some embodiments, for example, script analyzer 122 may identify a list of characters in the script. For example, the identified characters may be added to a data structure in memory 114 such as, e.g., an array.

In some embodiments, for example, script analyzer 122 may identify utterances associated with each character in the script. An utterance may include, for example, a statement made by a character to another character, a monologue for the character, a narrative to be spoken by a narrator, or any other text in the script that will be spoken by the character when acting out the script.

In some embodiments, script analyzer 122 may identify a target of each utterance. For example, if a first character makes an utterance to a second character, the target of the utterance, i.e., the second character, may also be identified in association with the utterance of the first character. If the first character makes an utterance without a target, e.g., a monologue, narration, etc., that utterance may be associated with the first character without being associated with another character as a target of the utterance.

In some embodiments, script analyzer 122 may identify a language of the script or portions of the script. For example, script analyzer 122 may perform natural language or rule-based processing on the script or portions of the script to identify a language of the script. In some embodiments, a language database may be included in data repository 150 that may be accessed by script analyzer 122 and used by script analyzer 122 to identify the language used in the script.

In some embodiments, a location of the script or portions of the script may be identified. For example, text in the script may be parsed and compared to known locations to determine a location of the script. In some embodiments, a database of locations may be stored in data repository 150 or in memory 114 that may be accessed and compared to the text of the script to determine a location of the script or a portion of the script. For example, the script may include the text London which may indicate that London is a location for a portion of the script. In some embodiments, rules may be applied to ensure that a simple mention of a location, e.g., "I want to go to London" is not captured as a location. For example, the location may be defined in the script in a structured manner, e.g., a scene background portion of the script, which indicates the location for the particular scene in the script. For example, in some embodiments, the rules may only analyze the portions of the script related to the background or location of the scene and may not analyze the lines of the script that will be spoken by characters. In some embodiments, natural language processing may analyze the context of the identified location to determine whether the identified location is a location of the scene or portion of the script or just an utterance by a character.

Any other attribute of the script may be identified in a similar manner as those described above.

At 206, a user of computing device 110 may be presented with the identified attributes of the script. For example, a graphical user interface (GUI) may be presented to the user, e.g., via display 118, that presents the identified attributes of the script. In some embodiments, the user may modify or adjust the identified attributes in the GUI, e.g., by activating one or more elements of the GUI. An example modification of identified attributes of a script using a GUI will be described in more detail below with reference to FIGS. 3 and 4.

At 208, script modifier 124 receives or obtains the identified attributes of the script from script analyzer 122, receives or obtains the modifications from the user in step 206 via the GUI, and modifies the script accordingly. As a non-limiting example, the script may be modified to change the attributes of the characters, e.g., demographic, age, gender, race, religion, style of utterances, vocabulary level, language, dialect, accent, or other similar attributes of the characters. As another example, locations of portions of the script, eras of portions of the script, languages of portions of the script, a context of portions of the script, or other similar attributes of the script may be modified.

At 210, script modifier 124 outputs the modified script.

Figure 3:
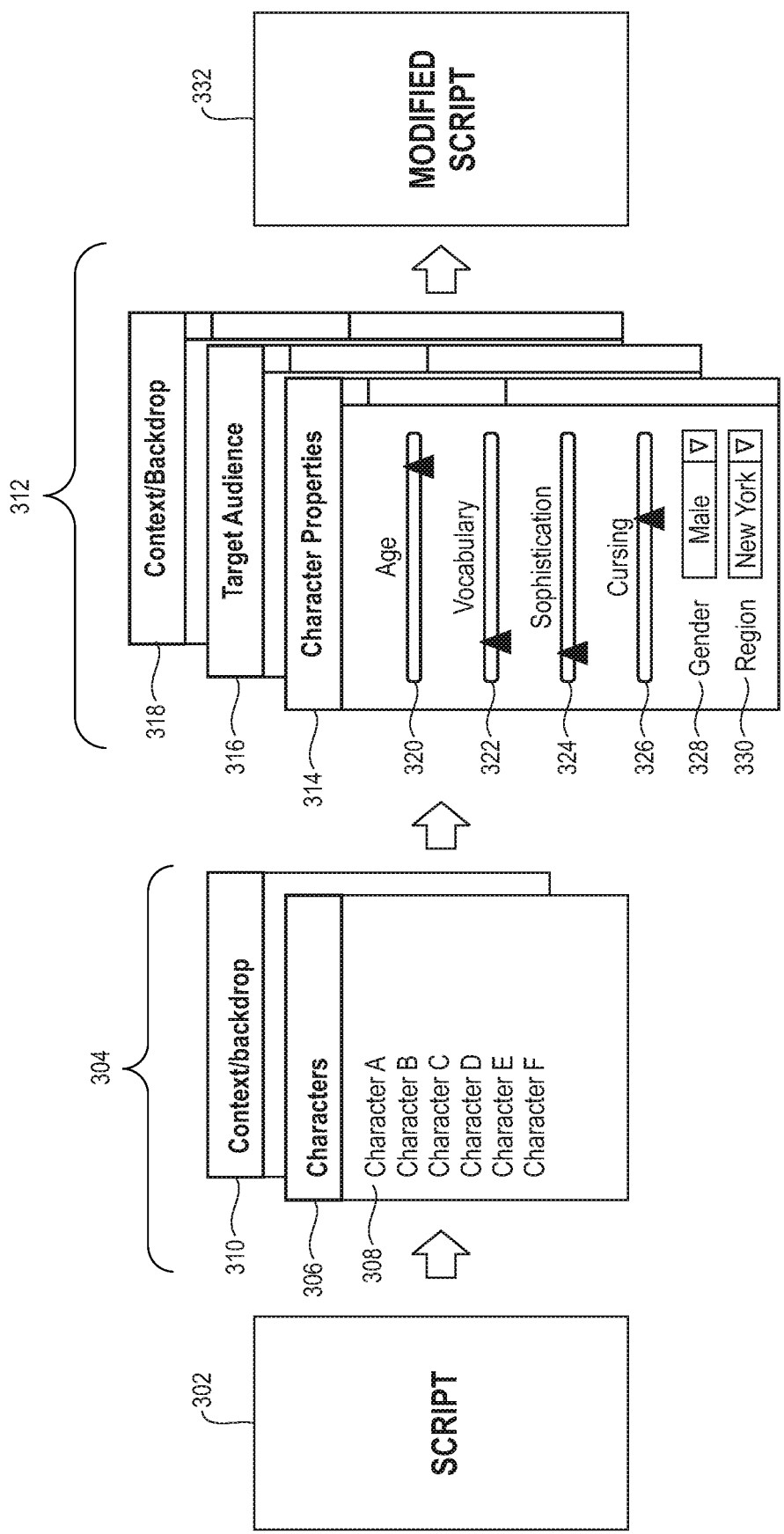
FIG. 3 is a flow diagram illustrating techniques according to an embodiment of the invention including example views of a graphical user interface (GUI)

FIG. 3 illustrates an example modification of a script in more detail according to an illustrative embodiment. In some embodiments, computing device 110 is configured to present a graphical user interface (GUI) to a user, e.g., via display device 118. The GUI presents views including elements that are activatable by a user to modify attributes of the script.

At 302, the script is ingested by computing device 110 as described above and is analyzed by script analyzer 122 to identify the attributes of the script or a portion of the script.

At 304, views may be presented by the GUI for the selection of a feature or portion of the script to be modified. For example, a characters view 306 may present the user with a list of characters for which attributes of the script may be modified. In some embodiments, the list of characters may include elements that may be activatable by the user, e.g., via input device 120, to select a particular character for attribute modification. For example, an element 308 may be activated by the user to select character A for attribute modification.

In some embodiments, additional views may be presented by the GUI for selection of a feature or portion of the script to be modified including, e.g., a context/backdrop view 310, a scene view, a language view, or any other view that allows a user to select an element or feature of the script for attribute modification.

At 312, views may be presented by the GUI for the modification of attributes associated with the feature or portion of the script selected at 304.

For example, a character properties view 314 may be presented in response to an activation by the user of an element in the characters view 306 such as, e.g., an activation of element 308 for character A. Character properties view 314 may include elements that are activatable to modify an attribute of the selected character, e.g., character A. For example, an age element 320, vocabulary element 322, sophistication element 324, cursing element 326, gender element 328, region element 330, name element, or any other element that may modify an attribute of the selected character in the script may be presented in character properties view 314 for activation by the user.

In some embodiments, age element 320 may be activated by the user to adjust or modify an age of the character. For example, in some embodiments, age element 320 may be a drop-down menu, slider or other similar element that allows the user to modify the age of the character.

In some embodiments, vocabulary element 322 may be activated by the user to adjust or modify a vocabulary of the character. For example, in some embodiments, vocabulary element 322 may be a drop-down menu, slider or other similar element that allows the user to modify the vocabulary of the character. For example, the vocabulary element 322 may adjust the vocabulary level of the character, e.g., first grade level, second grade level, . . . , high school level, college level, . . . , or other similar vocabulary levels.

In some embodiments, sophistication element 324 may be activated by the user to adjust or modify a sophistication of the character. For example, in some embodiments, sophistication element 324 may be a drop-down menu, slider or other similar element that allows the user to modify the vocabulary of the character. For example, the sophistication element 324 may adjust the level of sophistication in a language used by the character.

In some embodiments, cursing element 326 may be activated by the user to adjust or modify how often the character curses in the script. For example, in some embodiments, cursing element 326 may be a drop-down menu, slider or other similar element that allows the user to modify the cursing of the character. For example, the cursing element 326 may adjust the amount or type cursing used by the character.

Sophistication, Vocabulary, Cursing and Age are illustrative examples of attributes of the characters and are included herein for representative purposes. Other elements or attributes that may be used to define a particular character in a script may also or alternatively be used. For example, a formality attribute may be used to denote how much formal/informal language will be included in the character's utterances, a reasoning attribute may be used to denote how logical the utterances of the character should sound, and an emotional attribute may be used to denote to what extent the character is emotionally inclined, e.g., the emotional attribute may denote that the character is emotionally stable and can handle adverse circumstances without breaking down, may denote that the character is emotionally unstable and breaks down crying often. Any other attributes about the characters may be used to denote a particularity of how their utterances will be generated or framed in the script.

In some embodiments, gender element 328 may be activated by the user to change the gender of the character in the script. For example, in some embodiments, gender element 328 may be a drop-down menu, slider, or other similar element that allows the user to change the gender of the character. For example, as illustrated in FIG. 3, gender element 328 is set to male.

In some embodiments, region element 330 may be activated by the user to change the region that the character is from in the script. For example, in some embodiments, region element 330 may be a drop-down menu or other element that allows the user to change the region that the character is from. For example, as illustrated in FIG. 3, region element 330 is set to New York. For example, if the character is from the U.S., he will speak about New York, Wall Street, etc. more likely than a character from India. Moreover, a character from the U.S. is also more likely to speak in language colloquial to the U.S. than from India. The region defined by the region element 330 may be used to influence what the character speaks about and how the character speaks, e.g., slang, local dialect, etc.

Figure 4:
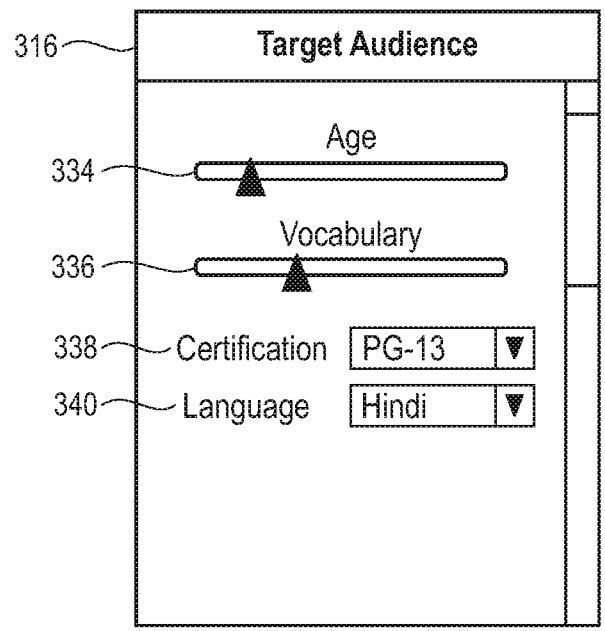
FIG. 4 is another example view of the GUI of FIG. 3 according to an embodiment of the invention.

With reference now to FIG. 4, in some embodiments, the GUI may present a user with a target audience view 316 for the modification of the script to target a particular audience at step 312 (FIG. 3). For example, the user may modify the attributes of the target audience for the script by activating elements of the target audience view 316. In some embodiments, for example, target audience view 316 may include an age element 334, a vocabulary element 336, a certification element 338, a language element 340, or any other element that may be used to modify an attribute of the script to target a particular audience.

Age element 334 may, for example, be activated by the user to modify the age of the target audience, e.g., kids, teenagers, young adults, middle aged, seniors, numerical ages, or any other age groups. In some embodiments, age element 334 may be a drop-down menu, slider, or other similar element that may be activated by the user to specify an age of the target audience for the script or portion of the script.

Vocabulary element 336 may, for example, be activated by the user to modify the vocabulary level of the script to match a target audience. For example, the vocabulary element 336 may be modified to a $5^{th}$ grade level of vocabulary for a target audience that includes kids in the $5^{th}$ grade. In some embodiments, vocabulary element 336 may be a drop-down menu, slider, or other similar element that may be activated by the user to specify a vocabulary level of the target audience for the script or portion of the script.

Certification element 338 may, for example, be activated by the user to modify a certification level of the script. For example, in some embodiments, if the unmodified script has a certification level of Rated R, the certification element 338 may be activated by the user to change the certification level of the script to PG-13 which may sanitize or adjust the content of the script to meet the guidelines of the lower certification level, e.g., by removing or replacing gore, blood, cursing, nudity, or any other attribute of the script that may cause the certification to be higher than PG-13. In some embodiments, certification element 338 may be a drop-down menu, slider, or other similar element that may be activated by the user to specify target certification level for the script or portion of the script.

Language element 340 may, for example, be activated by the user to modify a language of the script or portions of the script. For example, if the unmodified script is in English, the user may activate language element 340 to modify the language in the script to Hindi. In some embodiments, language element 340 may be a drop-down menu, slider, or other similar element that may be activated by the user to specify a language for the script or portion of the script.

Any other element that may be activated to modify an attribute of the script to match a particular target audience may also be included in target audience view 316.

Figure 5:
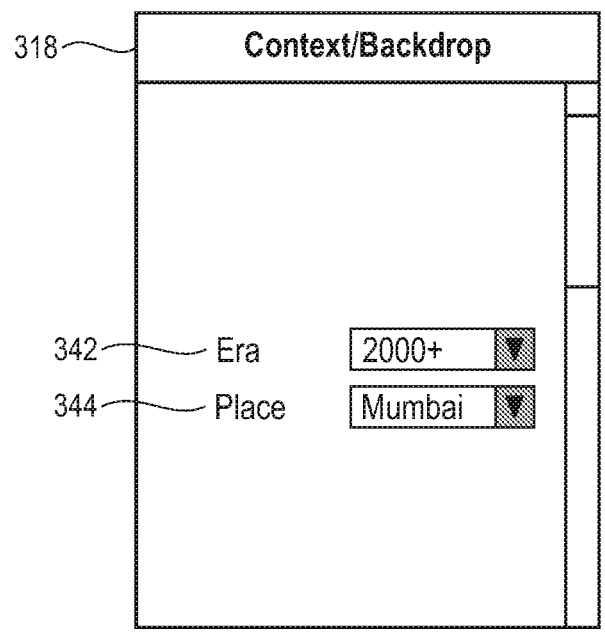
FIG. 5 is another example view of the GUI of FIG. 3 according to an embodiment of the invention.

With reference now to FIG. 5, in some embodiments, the GUI may present a user with a context/backdrop view 318 for the modification of the context or backdrop of the script or a portion of the script at step 312 (FIG. 3). For example, the user may modify the attributes of the context or backdrop for the script by activating elements of the context/backdrop view 318. In some embodiments, for example, context/backdrop view 318 may include an era element 342, a place element 344, or any other element that may be used to modify a context or backdrop attribute of the script or a portion of the script.

Era element 342 may, for example, be activated by the user to modify an era of the script or a portion of the script. For example, if the unmodified script was set in the 1900s era, the user may activate the era element 342 to modify the script, for example, to the 2000s era. In some embodiments, era element 342 may be a drop-down menu, slider, or other similar element that may be activated by the user to specify an era for the script or portion of the script.

Place element 344 may, for example, be activated by the user to modify a place or location setting for the script or a portion of the script. For example, if the unmodified script was set in New York, the user may activate the place element 344 to modify the script or portion of the script, for example, to take place in Mumbai. In some embodiments, place element 344 may be a drop-down menu, slider, or other similar element that may be activated by the user to specify a place or location setting for the script or portion of the script.

Referring back to FIG. 3, at 332, the script is modified based on the modifications from step 312. For example, the speech by character A may be modified based on the user's activation and modification of the elements in the character properties view 314, target audience view 316, context/backdrop view 318, or any other views that may be presented to a user for modifying the attributes of the script. For example, the speech by character A may be modified by reducing the vocabulary and sophistication of the speech based on the modification of the vocabulary element 322, sophistication element 324, or other elements of the GUI by the user.

Figure 6:
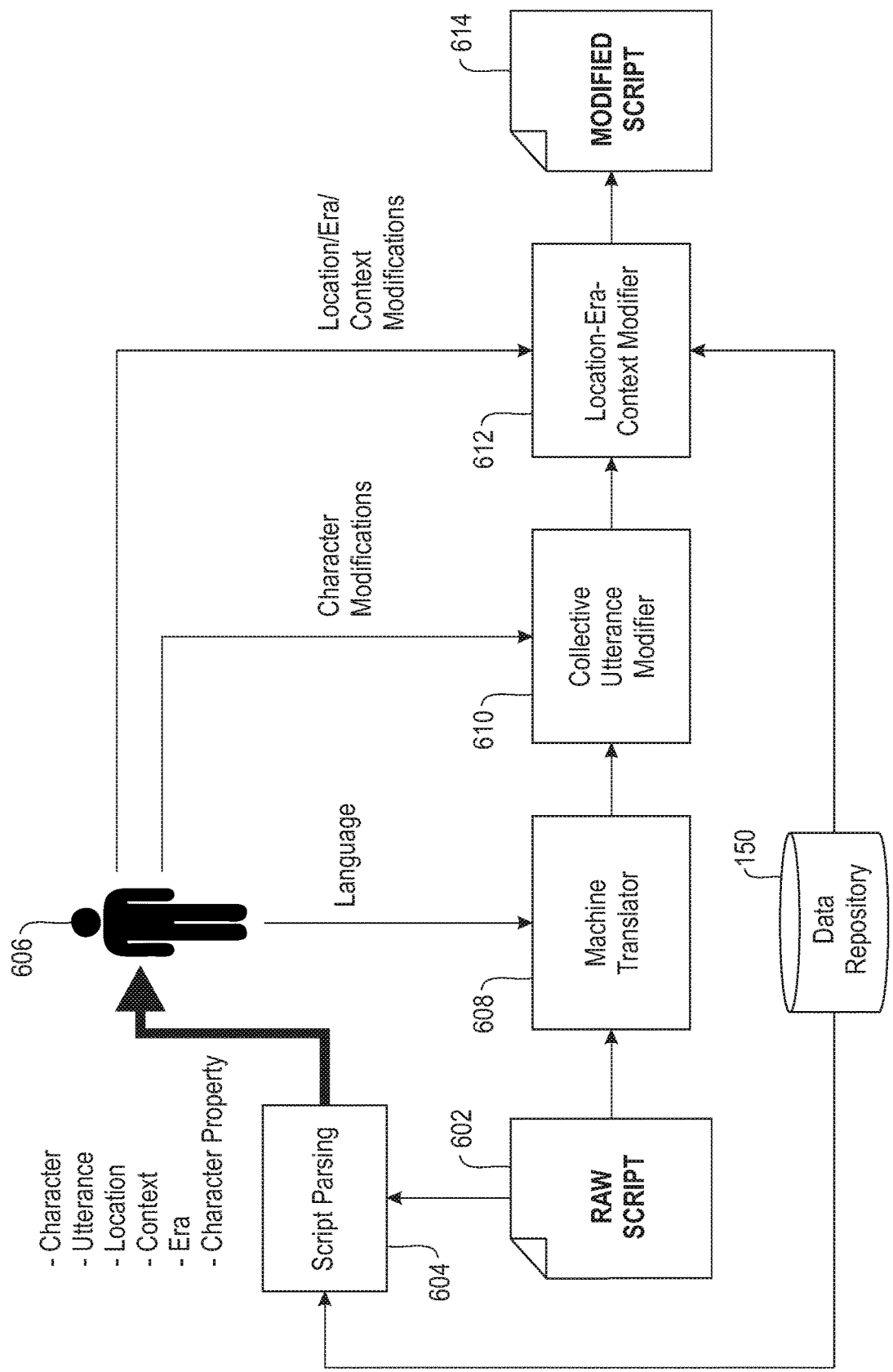
FIG. 6 is a flow diagram illustrating techniques according to an embodiment of the invention.

FIG. 6 is a flow diagram illustrating a method according to an illustrative embodiment.

At 602, the raw script is ingested by computing device 110.

At 604, script analyzer 122 parses the script to identify attributes of the raw script, for example, as described above. For example, script analyzer 122 may parse the raw script to identify characters, utterances, locations, contexts, eras, character properties or any other attributes of the raw script.

In some embodiments, script analyzer 122 may, for example, parse the raw script based on rules or other data obtained from data repository 150. In some embodiments, for example, script analyzer 122 may employ rule-based techniques to segment the script into one or more scenes, for example, by identifying specific formatting that may be found at the beginning of each scene in the raw script. Separation of the raw script into scenes may assist in later parsing by script analyzer 122. For example, a script for a movie may include multiple scenes where each scene may have a different setting and different characters. Because each scene may require a different modification, in some embodiments, the script analyzer may break the script into manageable chunks based on scenes and then the individual scenes may be analyzed and modified separately based on the requirements and attribute settings.

In some embodiments, script analyzer 122 may, for example, employ rule-based techniques to determine a character list and each character's utterances. For example, the rules may leverage formatting or other indications in the raw script that identify each character and their respective utterances such as, e.g., indentations, bold and italic type, font size, colons, semicolons, or other similar formatting.

In some embodiments, script analyzer 122 may utilize a prediction model to determine a target of each utterance. For example, a prediction model may be stored in data repository 150 and may be executed on the raw script by script analyzer 122 to identify the target of each utterance. In some embodiments, the prediction model may infer character properties such as, e.g., age, region, vocabulary, or other similar properties of the characters. For example, prediction model may be trained with various levels of vocabulary and may identify or determine a level of a character's vocabulary based on the identified utterances of the character and the training.

In some embodiments, for example, a prediction model may comprise a language model trained on specific characteristics of a character. For example, for a character in the U.S., the language model may be trained on dialogues of characters which appeared in movie scripts that were from the U.S., for example, a data set or corpus of scripts that include characters from the U.S. As another example, for a character aged below 30 years old, the language model may be trained using a data set or corpus of scripts including characters who are aged below 30 years old. In some embodiments, this training may be performed using recurrent neural networks (RNNs).

In some embodiments, the trained RNNs may be used as decoders to take as input any intermediate vectorial representation capturing the meaning of the character utterances and converting it into the utterances of the required character. For example, to convert utterances of an old man in India to utterances of a young man from the U.S., the utterances of the old man are passed through an encoder (e.g., an encoder also trained using RNNs in a similar manner to the training of the decoder) to covert the old man's utterances to an intermediate vectorial form. The decoder may then convert the intermediate vectorial form to utterances of a young man. The utterances of the young many may be further encoded into another intermediate vectorial form which is again decoded to convert the young man's utterances into utterances of a character from the U.S. This two-step encoding and decoding process may be used to convert the utterances of a character in the script to utterances corresponding to each attribute set for that character in the elements of the GUI. For example, as described above, the utterances of the old man may first be converted to the utterances of a young man followed by further conversion to the utterances of a person from the U.S. using the prediction models. Further conversions may be made, e.g., by encoding and decoding using the appropriate trained RNNs, based on other target attributes of the character.

In some embodiments, the era for the script or a portion of the script may be identified, for example, using prediction models. In some embodiments, for example, the era may be identified by the predictive model for every segment of the script. In some embodiments, for example, the prediction model may be trained as described above for era specific encoding and decoding. In an example, different language models may be trained for different eras such as, e.g., the 1960's, the 1970's, etc. The different language models may be used as decoders, e.g., trained using RNNs using a corpus of scripts based on the particular era, which can then be used for conversion from one era to another in a similar manner to the character based script modification mentioned above.

In some embodiments, location for the script or a portion of the script may be identified using data from data repository 150, for example, text in the script may be compared to a list of locations in the data repository 150 to identify locations in the script.

In some embodiments, a context of the script or a portion of the script may be inferred, for example, based on data in the data repository 150, using a prediction model, or both. For example, different prediction models for different contexts may be trained as mentioned above and used as decoders to alter the utterances of a character for a particular target context. As an example, language prediction models may be trained using a corpus of scripts or using data for historical events, wars, significant cultural events, or other similar events for which scripts may be written. As an example prediction models trained based on, e.g., World War I, World War II, The Civil War, The Indo-Pak War, the Vietnam War, or other similar significant events may be used as a basis for training prediction models if the script is for a movie genre that is war-related. The language prediction models may take all scripts about a particular war and train its RNN which can be used as a decoder to produce output language for that particular war-based context. Similarly, context could be a public gathering, meeting room conversation, romantic scene, battle scene, etc. Each such context may have a separate RNN language model trained to be used as a decoder.

At 606, computing device 110 may obtain user modifications from a user, for example, as described above by presenting a GUI to the user including activatable elements for various attributes of the raw script and receiving user activations of the elements. For example, the computing device 110 may receive a user activation that modifies the language attribute of the script or a portion of the raw script, receive user activations that modify attributes associated with the characters and their utterances in the raw script, receive user activations that modify the attributes associated with the location, era, and context of the raw script, or other attributes of the raw script as described above.

At 608, the raw script may, for example, be modified by script modifier 124 based on the language attribute obtained from the user via the GUI activations. For example, script modifier 124 may determine that the raw script, or a portion of the raw script, is in a first language, e.g., English, and that the user has activated a second language in the language element 340 (FIG. 3) of the GUI, e.g., Hindi. Script modifier 124 may translate the raw script, or portion of the raw script, into Hindi. For example, script modifier 124 may execute a machine translation of the script from English to Hindi. In some embodiments, the machine translation may be performed by script modifier 124 based on machine translation data stored in memory 114 of computing device 110 or memory 154 of data repository 150. In some embodiments, an external machine translation tool may be called by script modifier 124. For example, the external machine translation tool may be stored as part of a data processing center, on the cloud, or in any other location, and may be called by script modifier 124 to execute machine translation of the raw script from the first language to the second language, e.g., English to Hindi. In some embodiments, if script modifier 124 determines that the selected language is the same as the identified language of the raw script, no modification of the raw script may be made by script modifier 124 at 608.

At 610, with reference also to FIGS. 3 and 4, script modifier 124 modifies the characters and their corresponding utterances in the raw script, for example, based on the character attribute modifications obtained from the user via the GUI activations described above. For example, for each character identified in the raw script by script analyzer 122, script modifier 124 may determine whether the user has modified attributes associated with that character in the GUI, e.g., by activating age element 320, vocabulary element 322, sophistication element 324, cursing element 326, gender element 328, region element 330, or any other element associated with an attribute of a character. The script modifier 124 may then modify those attributes of the character or the character's utterances in the script.

For example, the age of the character may be modified by script modifier 124 based on the activation of the age element 322, the vocabulary used in the character's utterances may be modified by script modifier 124 based on the activation of the vocabulary element 322, the sophistication of the character's utterances may be modified by script modifier 124 based on the activation of the sophistication element 324, the amount of cursing in the character's utterances may be modified by script modifier 124 based on the activation of the cursing element 326, the gender of the character may be modified by script modifier 124 based on the activation of the gender element 328, the region of the character may be modified by script modifier 124 based on the activation of the region element 330, or other attributes of the character or character's utterances may be modified based on activation of a corresponding element in the GUI.

In some embodiments, for example, a user may activate the elements on the target audience view 316 to modify the age, vocabulary level, or certification level for a target audience of the script and script modifier 124 may modify the utterances of the characters in the script accordingly. In some embodiments, for example, elements in the target audience view 316 may define maximum levels for the content of the utterances of the characters. For example, the age, vocabulary level, and certification level elements may be used to reduce or limit the maximum amount of some or all of the character attributes from the character attributes view 314 for each character. For example, activation of age element 334, vocabulary element 336, or certification element 338 may modify or limit the maximum level that may be set by the user for age element 320, vocabulary element 322, sophistication element 324, cursing element 326 or other similar attributes of a character that may be reduced or increased depending on the attributes of the target audience.

In some embodiments, each utterance of a character may be passed through a set of utterance modifiers where each utterance modifier corresponds to an attribute of the character properties, target audience, or other attributes of the script. For example, each element of character properties view 314 and target audience view 316 may correspond to an utterance modifier where, for example, the utterances of each character may be passed through the utterance modifiers to adjust the utterances accordingly. As an example, if character A is selected by the user and some or all of the age element 320, vocabulary element 322, sophistication element 324, cursing element 326, gender element 328, and region element 330 of character properties view are modified, the utterances of character A may be passed through an utterance modifier corresponding to each of the elements 320-330 to modify the utterances in accordance with the values set in the character properties view. For example, in some embodiments, a given utterance of character A may be sequentially modified by the utterance modifiers corresponding to each of elements 320-330 to achieve an output utterance. In some embodiments, the given utterance may be further modified by utterance modifiers corresponding to the elements of target audience view 316, e.g., age element 334, vocabulary element 336, certification element 338, and language element 340. In some embodiments, for example, character properties elements 320-330 in character properties view 314 may be specific to the utterances of a selected character while elements 334-340 of target audience view 316 may be generic to the utterances of all characters.

In some embodiments, the above modifications may be made, for example using the trained models described above where, for example, some or all of the utterance modifiers may utilize the decoders and encoders of the trained models.

At 612, with reference also to FIG. 5, script modifier 124 modifies the locations, eras, and context in the raw script, for example, based on the attribute modifications obtained from the user via the GUI activations described above. For example, for each location, era, or context identified in the raw script by script analyzer 122, script modifier 124 may determine whether the user has modified attributes associated with that location, era, or context in the GUI. For example, if the user has activated and modified era element 342, place element 344 or other similar elements associated with context or backdrop attributes of the script from context/backdrop element 318, the script modifier 124 may modify the portions of the script that correspond to those attributes.

In some embodiments, for example, a user may activate the elements on the context/backdrop view 318 to modify an era, place, or other attribute of the context or backdrop of the script and script modifier 124 may modify the script accordingly. For example, activation of era element 342 may change the era of the script or a portion of the script. For example, if the era of the script as determined by script analyzer 122 is 1900 A.D. and the user activates era element 342 to modify the era to 2000+A.D., script modifier 124 may modify the script accordingly. For example, if the script includes a mill worker in 1900 A.D., the mill worker and surrounding context may be modified to an office worker at an IT firm in 2000+A.D. In some embodiments, the user may specify a job related conversion using one or more elements in the GUI, for example, from the mill worker to an office worker, from the mill worker to a factory worker, etc.

As another example, activation of place element 344 may change the location of the script or a portion of the script. For example, if the location of the script as determined by script analyzer 122 is New York, and the user activates place element 344 to modify the location to Mumbai, script modifier 124 may modify the script accordingly. For example, if the script includes locations such as, e.g., Brooklyn, Empire State Building, Statue of Liberty, etc., the locations in the script and other portions of the script that are dependent on the location may be modified to locations in and around Mumbai such as, e.g., modifying Brooklyn to Andheri, Statue of Liberty to India Gate, or other similar modifications. In some embodiments, the user may specify a location related conversion using one or more elements in the GUI, for example, from the Statute of Liberty to the India Gate, or from the Statute of Liberty to another prominent monument, etc.

In some embodiments, for example, a context of the script or portion of the script may also be modified. For example, the context may be modified based on a modification to the era element 342 and place element 344, based on a modification to a context element, or based on any other modification. For example, if a context of the script or portion of the script is determined by script analyzer 122 to be the Vietnam War, the activation of the era or place elements 342 and 344 may require a modification of this determined context. For example, if the era and location of the script or portions of the script have changed, the context, e.g., in this case the Vietnam War, must also change to comply with the new era and location. For example, the context, e.g., Vietnam War, may be modified to a war in the appropriate era and in the region of Mumbai, for example, one of the Indo-Pak wars. In some embodiments, the user may specify a context related conversion using one or more elements in the GUI, for example, from the Vietnam War to the Indo-Pak War, Vietnam War to another war, etc.

At 614, the modified script is output based on the above changes and may be presented to the user, e.g., via the GUI.

The techniques depicted in FIG. 2-6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2-6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 112. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
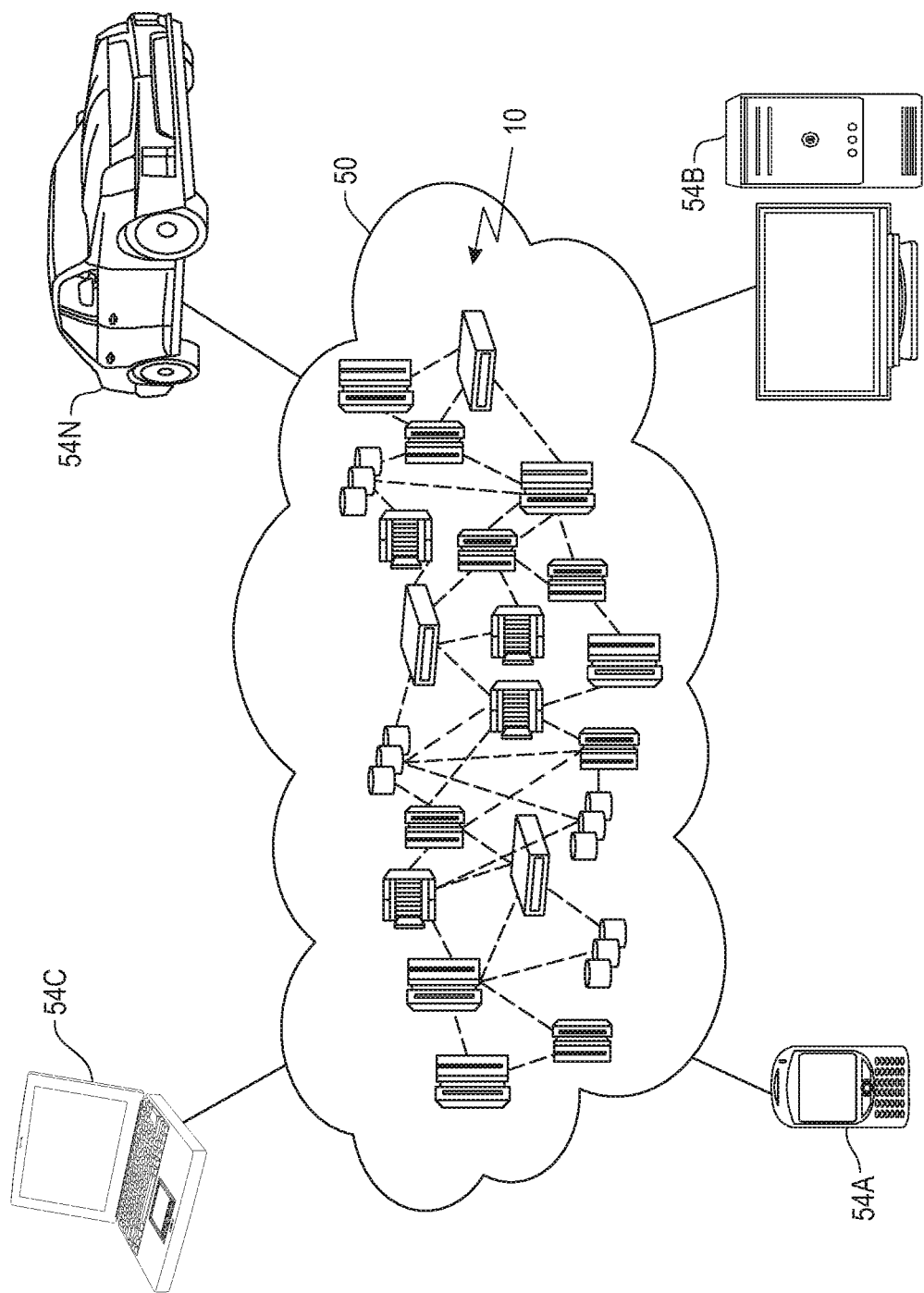
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
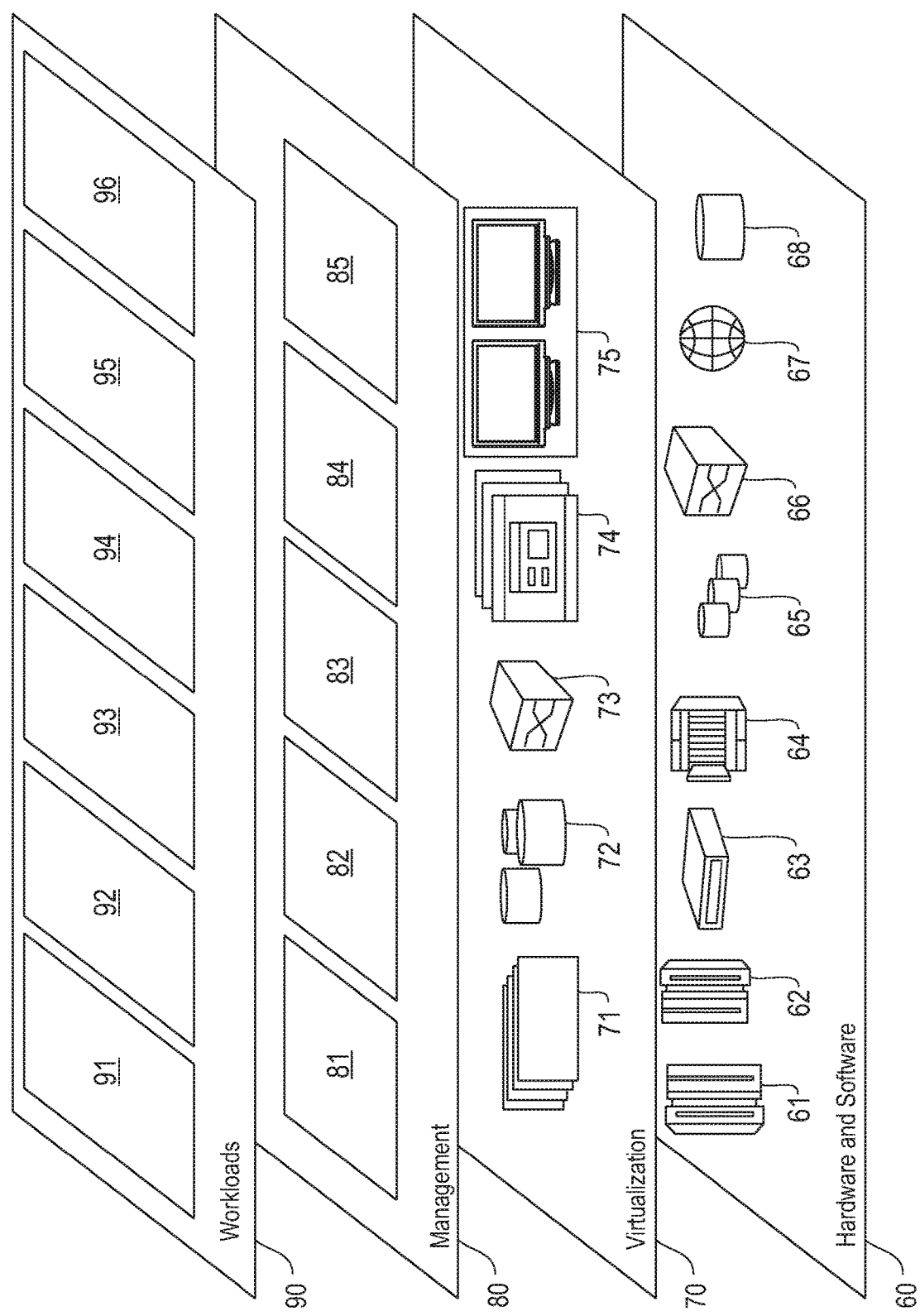
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and script modification 96.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:
   receiving a script comprising text;
   parsing the text of the script to identify at least one attribute of the script, wherein said identifying comprises identifying a list of characters included in the script and identifying utterances in the script associated with each identified character;
   presenting the identified at least one attribute to a user in a graphical user interface via a display device;
   receiving, from the user via an input device, an adjustment of at least one element in the graphical user interface that corresponds to the at least one attribute;
   receiving, from a data repository, modification data corresponding to the at least one attribute, wherein the modification data comprises at least one of: a plurality of utterance modifiers and a plurality of alternative characters;
   modifying the text of the script corresponding to the at least one attribute based on (i) the received adjustment and (ii) the obtained modification data corresponding to the at least one attribute, wherein said modifying comprises at least one of:
      modifying the text corresponding to at least one of the identified utterances by applying at least one of the utterance modifiers to the text corresponding to at least one of the identified utterances based on the received adjustment, and
      replacing the identified at least one of the characters in the list of characters with at least one of the alternative characters based on the received adjustment; and
   generating a modified script based on the modified text corresponding to the at least one attribute;
   wherein the steps are carried out by at least one computing device.

2. The computer-implemented method of claim 1, wherein said parsing the script comprises segmenting the script into at least one scene.

3. The computer-implemented method of claim 1,
   wherein the modification data comprise the plurality of alternative characters; and
   wherein said modifying the text of the script corresponding to the at least one attribute comprises said replacing the identified at least one of the characters in the list of characters with at least one of the alternative characters based on the received adjustment.

4. The computer-implemented method of claim 1,
   wherein the modification data comprise a plurality of utterance modifiers; and
   wherein said modifying the text of the script corresponding to the at least one attribute comprises said modifying at least one of the identified utterances by applying at least one of the utterance modifiers to the at least one of the identified utterances based on the received adjustment.

5. The computer-implemented method of claim 1, wherein said modifying the text of the script corresponding to the at least one attribute comprises modifying the text corresponding to at least one of the identified utterances by sequentially applying two or more of the utterance modifiers to the at least one of the identified utterances based on the received adjustment.

6. The computer-implemented method of claim 1,
   wherein said identifying the at least one attribute comprises identifying at least one character property associated with a given character of the identified list of characters;
   wherein the received adjustment of the at least one element comprises the selection of a change to the at least one character property associated with the given character; and wherein said modifying the text of the script corresponding to the at least one attribute comprises modifying the text corresponding to at least one of the identified utterances based on the selected change to the at least one character property associated with the given character.

7. The method of claim 6,
wherein the at least one character property associated with the given character of the identified list of characters comprises one or more of: an age and a vocabulary level, and wherein the at least one element in the graphical user interface comprises at least one slider corresponding to at least one of the age and the vocabulary level;
wherein the adjustment from the user is received at the at least one slider via the input device; and
wherein said modifying the text of the script corresponding to the at least one attribute is based on a direction and length of the adjustment of the at least one slider.

8. The computer-implemented method of claim 1,
wherein said identifying the at least one attribute comprises identifying a target of the at least one of the identified utterances; and
wherein said modifying the text of the script corresponding to the at least one attribute comprises modifying the text corresponding to at least one of the identified utterances by applying the at least one of the utterance modifiers to the at least one of the identified utterances based on the identified target.

9. The computer-implemented method of claim 1,
wherein said identifying the at least one attribute comprises identifying an era for at least a portion of the script;
wherein the received adjustment of the at least one element comprises the selection of an era different than the identified era;
wherein the modification data comprise a plurality of era modifiers for a plurality of eras, and
wherein said modifying the text of the script corresponding to the at least one attribute comprises applying at least one of the era modifiers corresponding to the selected era to adjust attributes of the script to correspond to the selected era.

10. The computer-implemented method of claim 1,
wherein said identifying the at least one attribute comprises identifying a location for at least a portion of the script;
wherein the received adjustment of the at least one element comprises the selection of a location different than the identified location;
wherein the modification data comprise a plurality of location modifiers for a plurality of locations; and
wherein said modifying the text of the script corresponding to the at least one attribute comprises applying at least one of the location modifiers corresponding to the selected location to adjust attributes of the script to correspond to the selected location.

11. The computer-implemented method of claim 1,
wherein said identifying the at least one attribute comprises identifying a context for at least a portion of the script,
wherein the received adjustment of the at least one element comprises the selection of a context different than the identified context;
wherein the modification data comprise a plurality of context modifiers for a plurality of contexts; and wherein said modifying the text of the script corresponding to the at least one attribute comprises applying at least one of the context modifiers corresponding to the selected context to adjust attributes of the script to correspond to the selected context.

12. The computer-implemented method of claim 11,
wherein the identified context comprises a language;
wherein the selection of a context different than the identified context comprises the selection of a language different than the language of the identified context; and
wherein said applying the at least one of the context modifiers corresponding to the selected context to adjust attributes of the script comprises translating at least a portion of the text of the script into the selected language.

13. The computer-implemented method of claim 1,
wherein said identifying the at least one attribute comprises identifying a backdrop for at least a portion of the script;
wherein the received adjustment of the at least one element comprises the selection of a backdrop different than the identified backdrop;
wherein the modification data comprise a plurality of backdrop modifiers for a plurality of backdrops, and
wherein said modifying the text of the script corresponding to the at least one attribute comprises applying at least one of the backdrop modifiers corresponding to the selected backdrop to adjust attributes of the script to correspond to the selected backdrop.

14. A computer program product comprising a non-transitory computer readable storage medium having program instructions embodied therewith, the program instructions executable by a computing device to cause the computing device to:
receive a script comprising text;
parse the text of the script to identify at least one attribute of the script, wherein said identifying comprises identifying a list of characters included in the script and identifying utterances in the script associated with each identified character;
present the identified at least one attribute to a user in a graphical user interface via a display device;
receive, from the user via an input device, an adjustment of at least one element in the graphical user interface that corresponds to the at least one attribute, wherein the modification data comprises at least one of: a plurality of utterance modifiers and a plurality of alternative characters;
receive, from a data repository, modification data corresponding to the at least one attribute;
modify the text of the script corresponding to the at least one attribute based on (i) the received adjustment and (ii) the obtained modification data corresponding to the at least one attribute, wherein said modifying comprises at least one of:
    modifying the text corresponding to at least one of the identified utterances by applying at least one of the utterance modifiers to the text corresponding to at least one of the identified utterances based on the received adjustment, and
    replacing the identified at least one of the characters in the list of characters with at least one of the alternative characters based on the received adjustment; and
generate a modified script based on the modified text corresponding to the at least one attribute.

15. The computer program product of claim 14,
wherein the modification data comprise a plurality of alternative characters; and
wherein said modifying the text of the script corresponding to the at least one attribute comprises replacing the identified at least one of the characters in the list of characters with at least one of the alternative characters based on the received adjustment.

16. The computer program product of claim 14,
wherein the modification data comprise a plurality of utterance modifiers; and
wherein said modifying the text of the script corresponding to the at least one attribute comprises said modifying at least one of the identified utterances by applying at least one of the utterance modifiers to the at least one of the identified utterances based on the received adjustment.

17. The computer program product of claim 14,
wherein said identifying the at least one attribute comprises identifying an era for at least a portion of the script;
wherein the received adjustment of the at least one element comprises the selection of an era different than the identified era;
wherein the modification data comprise a plurality of era modifiers for a plurality of eras; and
wherein said modifying the text of the script corresponding to the at least one attribute comprises applying at least one of the era modifiers corresponding to the selected era to adjust attributes of the script to correspond to the selected era.

18. The computer program product of claim 14,
wherein said identifying the at least one attribute comprises identifying a location for at least a portion of the script;
wherein the received adjustment of the at least one element comprises the selection of a location different than the identified location;
wherein the modification data comprise a plurality of location modifiers for a plurality of locations; and
wherein said modifying the text of the script corresponding to the at least one attribute comprises applying at least one of the location modifiers corresponding to the selected location to adjust attributes of the script to correspond to the selected location.

19. The computer program product of claim 14,
wherein said identifying the at least one attribute comprises identifying at least one character property associated with a given character of the identified list of characters;
wherein the received adjustment of the at least one element comprises the selection of a change to the at least one character property associated with the given character; and
wherein said modifying the text of the script corresponding to the at least one attribute comprises modifying the text corresponding to at least one of the identified utterances based on the selected change to the at least one character property associated with the given character.

20. A system comprising:
a memory; and
at least one processor operably coupled to the memory and configured for:
  receiving a script comprising text;
  parsing the text of the script to identify at least one attribute of the script, wherein said identifying comprises identifying a list of characters included in the script and identifying utterances in the script associated with each identified character;
  presenting the identified at least one attribute to a user in a graphical user interface via a display device;
  receiving, from the user via an input device, an adjustment of at least one element in the graphical user interface that corresponds to the at least one attribute;
  receiving, from a data repository, modification data corresponding to the at least one attribute, wherein the modification data comprises at least one of: a plurality of utterance modifiers and a plurality of alternative characters;
  modifying the text of the script corresponding to the at least one attribute based on (i) the received adjustment and (ii) the obtained modification data corresponding to the at least one attribute, wherein said modifying comprises at least one of:
  modifying the text corresponding to at least one of the identified utterances by applying at least one of the utterance modifiers to the text corresponding to at least one of the identified utterances based on the received adjustment, and
  replacing the identified at least one of the characters in the list of characters with at least one of the alternative characters based on the received adjustment; and
  generating a modified script based on the modified text corresponding to the at least one attribute.

* * * * *